Aug. 24, 1937. J. MILLER 2,090,695

LIQUID LEVEL CONTROL DEVICE

Filed March 3, 1933

INVENTOR.
John Miller
BY
Bottum, Hudnall, Lecher,
McNamara and Michael
ATTORNEYS Patented Aug. 24, 1937

2,090,695

UNITED STATES PATENT OFFICE 2,090,695

LIQUID LEVEL CONTROL DEVICE

John Miller, Lansing, Mich., assignor to Automatic Products Company, Milwaukee, Wis., a corporation of Wisconsin Application March 3, 1933, Serial No. 659,510

8 Claims. (Cl. 137—68)

This invention relates to liquid level control devices especially designed and adapted for use in connection with oil burners.

With oil burners of the type employing a gravity feed of the liquid fuel it is usual to employ a float controlled inlet valve to maintain a certain level of oil or fuel in the fuel supply chamber associated with the oil burner.

One of the objects of the present invention is to provide a constant level control device wherein closing of the inlet valve when the oil reaches the selected or predetermined level is insured and this even though the main float which normally controls the operation of the valve is ineffective or fails to move the valve to closed position.

Another object is to provide a device of this character which is simple and durable in construction, reliable and effective in operation, and easy and comparatively inexpensive to manufacture.

The present invention proposes a constant level control device having a casing or similar means providing a fuel supply chamber. In the chamber a selected or predetermined level of fuel is maintained by virtue of the action of a float controlled inlet valve. Normally, the main float, which controls the inlet valve, is effective to maintain the desired level, the float opening the inlet valve when the level drops below that selected or predetermined and closing it when the selected or predetermined level is reached. At times, due to the presence of grit on the valve seat of the inlet valve or for other reasons, the main float is ineffective to close the inlet valve. With the present invention should the inlet valve fail to close and the level of the fuel rise above that selected or predetermined then an auxiliary float is buoyed up by the liquid and an auxiliary operator is set into action and punches the inlet valve to closed position. The auxiliary operator is biased by a weight or spring to punch the valve to closed position but normally it is latched against movement, the latch being, however, released by the auxiliary operator upon the abnormal or undesirable rise of the liquid in the fuel supply chamber. Provision is made for readily resetting the auxiliary valve operator.

Figure 1:
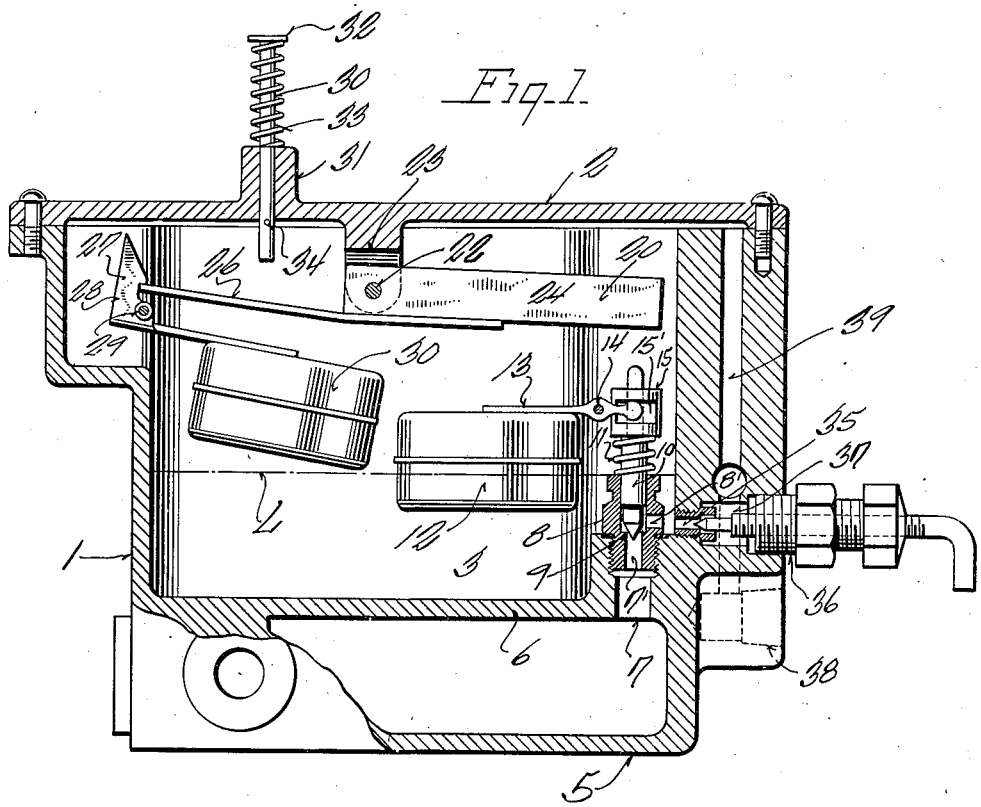
Figure 2:
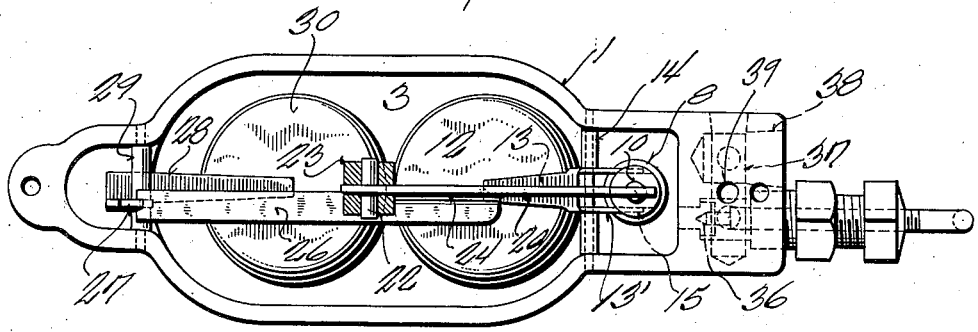

Other objects and advantages reside in certain novel features of the construction, arrangement and combination of parts which will be hereinafter more fully described and particularly pointed out in the appended claims, reference being had to the accompanying drawing, forming a part of this specification, and in which:

Figure 1 is a view partly in central longitudinal vertical section and partly in side elevation showing a constant level device embodying the present invention; and Figure 2 is a view in top plan further illustrating the device of Figure 1, the top or cover plate of the device being removed and parts being shown in section for the sake of illustration.

Referring to the drawing, it will be seen that the constant level device embodying the present invention comprises a casing 1 provided with a removable top or cover plate 2 having formed therein a fuel supply chamber 3. At the underside of the casing a supply conduit 5 is provided and is adapted to contain a suitable strainer (not shown). In the wall 6 between the conduit 5 and the chamber 3, a flanged opening 7 is provided. The lower end of a valve casing 8 is threaded into this opening 7 and has a valve seat 9 with which a needle valve 10 coacts. The needle valve may be biased to open position by a spring 11 and is opened and closed to regulate the flow of oil or fuel into the chamber 3 by means of a main float 12, the float being secured to a lever 13 fulcrumed as at 14 on the casing and having its bifurcated end 13' operatively interconnected with the side slots 15' of a collar 15 fixed on the stem of the needle valve. When the level of the liquid in the chamber 3 drops below the selected or predetermined level the float 12 falls and this motion of the float is transmitted through the lever 13 to the needle valve 10 to open the same. Fuel then flows through the opening 7, through the axial passage 7' in the valve casing 8, past the valve seat 9 and out through the lateral port 8' formed in the valve casing, and into the chamber 3. When the level of the liquid in the chamber 3 reaches that which has been selected or predetermined the float 12 is buoyed up and the lever 13 swings in a clockwise direction as viewed in Figure 1, thereby shifting the needle valve 10 to closed position.

At times, due to the presence of grit on the valve seat 9 or for other reasons, the float 12 is ineffective to close the valve even though the level of the liquid in the chamber 2 rises above a selected or predetermined level.

The present invention proposes the provision of auxiliary means for insuring the closure of the needle valve 10 when such conditions obtain. Broadly, this auxiliary means consists of a valve closing member or valve operator biased to a position wherein it is effective to punch or forcibly move the needle valve to closed position, the valve operator being, however, normally latched in inoperative position. A second or auxiliary float controls the action of the latch and is so combined with the other elements of the device that it functions to release the latch when the level in the fuel supply chamber rises above the selected or predetermined level.

In the construction illustrated in the drawing, the auxiliary valve operator designated at 20 is in the form of a lever fulcrumed as at 22 on bracket lugs 23 depending from the cover 2 and having a long and heavy arm 24, the outer end of which overlies the upper end of the needle valve stem 10. The lever 24 also has a light and rather short arm 26 with which a latch 27 is engageable. The latch 27 is formed on one arm of a lever 28 fulcrumed as at 29 on the casing and fixedly secured to an auxiliary float 30. It will be understood that the weight of the arm 24 urges it to swing downwardly until it strikes the upper end of the stem of the needle valve 10 and punches the needle valve to closed position. This action may be enhanced by providing additional weights on the arm 24 or by using a spring to bias the arm 24 downwardly. Ordinarily, the auxiliary operator is retained in the position shown in Figure 1 by the latch 27. However, should the level rise above the line L, the float 30 will be raised and the latch 27 swung away from the end of the arm 26 and out of enagement therewith, thus permitting the arm 24 to fall and strike the upper end of the valve stem 10.

For the purpose of resetting the valve operator, a resetting rod 30 is slidably fitted in a bearing 31 provided therefor in the cover 2. The upper end of the rod 30 has a knob 32 to facilitate depression of the rod. A spring 33 between the bearing and the knob 32 holds the rod elevated. A cross pin 34 is carried by the rod and engages the cover 2 to limit the upward movement of the rod 30. By depressing the rod its lower end engages the arm 26 to swing the lever 20 until the end of the arm 26 is re-engaged by the hook 27.

The oil flows out from the chamber 3 through the axial opening of a valve seat member 35. A metering valve 36 of any suitable construction regulates the outflow of the fuel. After passing through the valve seat member 35 the oil travels through passages 37 to an outlet connection 38 from which a pipe line or other suitable connection (not shown) leads to the burner. As is usual, the outlet passages 37 may be vented by means of a vent passage 39.

While I have shown and described one construction in which the invention may be embodied, it is to be understood that this construction has been selected merely for the purposes of illustration and that various changes in the size, shape and arrangement of the parts may be made without departing from the spirit of the invention or the scope of the subjoined claims.

The invention claimed is:

1. A device of the character described comprising a casing having a chamber therein, a single seat inlet valve regulating the flow of liquid into said chamber to maintain a selected liquid level therein, liquid level responsive means to normally actuate said valve, a weighted valve closing lever fulcrumed within the chamber and overlying said inlet valve and effective when dropped to punch said valve to closed position, a latching lever fulcrumed in said casing and engageable with the valve closing lever to maintain the same elevated, a float in said chamber and connected to said latching lever for disengaging the latching lever from the valve closing lever upon rise of the liquid in said chamber a certain extent above said level, and a resetting rod operable from the exterior of the casing and projecting thereinto and engageable with said valve closing lever to reset the same.

2. A device of the character described comprising a casing having a chamber therein, a single seat inlet valve regulating the flow of liquid into said chamber to maintain a selected liquid level therein, liquid level responsive means to normally actuate said valve, a weighted valve closing lever fulcrumed within the chamber and overlying said inlet valve and effective when dropped to punch said valve to closed position, a latching lever fulcrumed in said casing and engageable with the valve closing lever to maintain the same elevated, a float in said chamber and connected to said latching lever for disengaging the latching lever from the valve closing lever upon rise of the liquid in said chamber a certain extent above said level, and a resetting rod operable from the exterior of the casing and projecting thereinto and engageable with said valve closing lever to reset the same, said latching lever having means engageable with the valve closing lever to cause the latch to be reset upon resetting of the valve closing lever.

3. A device of the character described comprising a casing having a chamber therein, a single seat valve regulating the flow of liquid into said chamber, a main float in said chamber controlling said valve to maintain a selected liquid level in said chamber, a single weighted valve closing lever fulcrumed in said chamber with its weighted end overlying the valve whereby said weighted end is effective when dropped directly to engage said valve and punch it to closed position, a latch in said chamber cooperable with said lever to secure it in a position wherein its weighted end is elevated and spaced from the valve, and a second float in said chamber and connected to the latch whereby to release the latch upon rise of the liquid in said chamber to a level above the selected level.

4. A device of the character described comprising a casing having a chamber therein, there being an inlet to and an outlet from said chamber, an inlet valve cooperable with said inlet, liquid level responsive means to normally actuate said valve, an auxiliary operator for said valve in said chamber, and a float in said casing controlling the action of said operator, said float being actuated when the level in the chamber rises a certain extent above that normally maintained by said liquid level responsive means, said level responsive means and said auxiliary operator co-operating to close said valve as said liquid level rises a certain extent above that normally maintained, said outlet being effective to drain off any excess of liquid that may have flowed into said chamber.

5. A device of the character described comprising a casing having a chamber therein, there being an inlet to and an outlet from said chamber, an inlet valve cooperable with said inlet, liquid level responsive means in said chamber to normally actuate said valve, a lever in said chamber biased to punch said valve to closed position, a latch in said chamber for retaining the lever in inoperative position and a float connected to said latch and operated, when the level in said chamber rises a certain extent above that normally maintained therein under the influence of said liquid level responsive means, to release said latch and provide for the punching of the valve closed by said lever, said level responsive means and said lever cooperating to close said valve as the level in said chamber rises a certain extent above that normally maintained, said outlet being effective to drain off any excess of liquid that may have flowed into said chamber.

6. A device of the character described comprising a casing having a chamber therein, there being an inlet to and an outlet from said chamber, an inlet valve cooperable with said inlet, liquid level responsive means in said chamber to normally actuate said valve, an auxiliary operator in said chamber biased to punch said valve to closed position, a latch in said chamber for retaining the auxiliary operator in inoperative position, and a float connected to said latch and positioned in said chamber above the level normally maintained therein under the influence of said liquid level responsive means, said float being operable when buoyed up by the rise of liquid to a certain extent above said normal level to release said latch and provide for the punching of the valve closed by said auxiliary operator, said level responsive means and said auxiliary operator cooperating to close said valve when the liquid rises to above normal as aforesaid, said outlet being effective to drain off any excess of liquid that may have flowed into said chamber.

7. A liquid level control device comprising a chamber having an inlet opening and an outlet opening, a valve in said inlet opening having a stem extending and terminating in said chamber, said valve being movable upwardly to permit the passage of liquid into said chamber, a liquid level control float positioned in said chamber and connected with said stem intermediate its ends to raise and lower said valve and regulate the flow of liquid to said chamber, said float being adapted to move said valve downwardly to close the same when the liquid in said chamber rises to a predetermined level, weighted means carried in said chamber and adapted to descend and strike against said stem to force said valve downwardly to close said valve, a latch within said chamber to normally hold said means raised from said stem, and an auxiliary float positioned in said chamber and connected with said latch and operable to release the same when the liquid level rises to a certain extent above said predetermined level.

8. A liquid level control device comprising a chamber having an inlet and outlet opening, a valve in said inlet opening having a stem projecting into and terminating in said chamber, a liquid level control float connected to said stem intermediate its ends and operable to force said valve downwardly to close said inlet opening as the liquid level rises to a predetermined point, a weighted means carried in said chamber and adapted to descend upon and strike against said stem to force said valve downwardly, a latch in said chamber normally holding said weighted means in raised position above said stem, an auxiliary float in said chamber and operatively connected to said latch to cause it to release said means when the liquid level in said chamber rises a certain extent above said predetermined point, said weighted means cooperating with said control float to force said valve down, and resetting means operable from the exterior of said chamber to re-latch said weighted means after the liquid in said chamber has receded to said predetermined point.

JOHN MILLER.